Patented Mar. 8, 1949

2,463,663

UNITED STATES PATENT OFFICE 2,463,663

MAGNESIUM OXYCHLORIDE COATING MATERIAL

Albert I. Wand, Pasadena, Calif., assignor to Mundet Cork Corporation, Brooklyn, N. Y., a corporation of New York No Drawing. Application September 12, 1945, Serial No. 615,930

2 Claims. (Cl. 106—86)

This invention relates to a coating adapted to cover any desired surface and in its more specific aspects aims to provide an insulating covering as well as a method of preparing the same for use.

It is an object of the invention to provide a composition of matter which may readily be handled in suitable containers and mixed with a suitable proportion of liquid so that the desired coating may, at that time, be provided. Such mixing and application of the material will require no especial technique or extraordinary skill nor will it require the employment of expensive and complicated apparatus.

A further object is that of furnishing a coating which will be substantially non-corrosive. When applied to metal lath or a similar mounting body, it will—after it has once set—resist removal from that body far beyond any strains to which it would be subjected under normal usage.

Moreover, by the present invention a protective coating material is furnished which may be produced from a composition of materials which, when packaged in accordance with the present teachings, will remain in properly usable condition for relatively long periods of time.

With these and other objects in mind, reference is had to the following specification for a disclosure of the composition and the method of packaging the same. It will be understood that the specification is merely illustrative and that the various proportions indicated might be varied and that certain materials might be substituted for others without departing from the spirit of the invention and except where otherwise indicated in the appended claims.

Thus, I employ granulated cork to 2¼% by weight of the entire composition. Asbestos, to the extent of 2½%, is employed. Talc is utilized to the extent of 14¼% by weight. Expanded vermiculite is utilized to the extent of 3%. Limerock is employed to the extent of 23%, magnesite to the extent of 29%, and flake Mag. chloride to the extent of 26%. As afore brought out, all of these percentages are by weight. Certain of them may be varied within limits. However, I have found that for best results approximately the percentages afore indicated should be employed.

The cork may comprise granules of ordinary fineness. The asbestos is preferably of the 5R type. In other words, it is an asbestos fiber graded by the Quebec screen test. As is well known, this test, as specified, will provide for ten ounces of fiber being retained on a grading screen while six ounces of a complete sixteen ounce mass passes through the screen.

The expanded vermiculite should be minus 14 mesh; the 14 mesh indicating the size of screen wire that is used for grading this material. The limerock should be #80 mesh or, otherwise stated, a flour of this material which will pass through a screen having 80 meshes to the inch.

With respect to the flake magnesium chloride, it will be understood that this is the chloride secured from the slurry of evaporated salt beds. In other words, it is the residue after the sea water has been evaporated and the salt removed. The magnesium is dehydrated into a flake ingredient.

Returning to a consideration of the vermiculite, it is—according to the present method—treated after being received in the raw state. This treating involves suitable heating as a consequence of which the material expands into a light, fluffy compound. All of the several materials may be mixed together in substantially the afore indicated proportions and used by adding a suitable quantity of water to prepare a proper mix. Thereupon, they may be applied to a mounting surface such as, for example, a metal lath.

However, having in mind that the flake magnesium chloride is particularly susceptible to atmospheric moisture, it is preferred—according to the present invention—to introduce this substance into the receptacle which receives the composition in such a manner that it is enclosed within or surrounded by the other ingredients. This may conveniently be done by having the talc and expanded vermiculite at the top of the receptacle, the flake magnesium chloride below the same, and the other materials in turn below the chloride. Thus, the hydroscopic characteristics of the latter will not result in atmospheric moisture being immediately absorbed thereby so that the composition would rapidly become unusable. Rather, under normal atmospheric conditions, it is found that the composition will remain stable and usable for relatively long periods of time which will be adequate to permit the packaging and shipping of the material as well as using of the same.

When so used, it will be found that a coating having high insulating value results. Moreover, this coating may be subjected, without detriment, to all reasonable shocks and vibrations. It will be substantially non-corrosive and when once set will be very difficult to displace from a mounting surface. It will remain inert and protective of that and underlying surfaces throughout its entire effective life.

Additionally, a coating embodying the present teachings will incorporate fireproofing qualities; it being understood that it will resist fusion and breakage even when subjected to instense heat.

Thus, among others, the several objects of the invention as specifically afore noted are achieved. Obviously, numerous changes in the percentages as well as in certain of the materials employed may be resorted to without departing from the spirit of the invention as defined by the claims.

I claim:

1. A coherent coating comprising a composition of the following materials provided by weight in substantially the following percentages:

| | Per cent |
|---|---|
| Granulated cork | 2¼ |
| Asbestos | 2½ |
| Talc | 14¼ |
| Expanded vermiculite | 3 |
| Limerock | 23 |
| Magnesite | 29 |
| Flake magnesium chloride | 26 |

2. A coherent coating comprising a composition of the following materials provided by weight in substantially the following percentages:

| | Per cent |
|---|---|
| Granulated cork | 2¼ |
| Asbestos 5R | 2½ |
| Talc | 14¼ |
| Expanded vermiculite—minus 14 mesh | 3 |
| Limerock #80 | 23 |
| Magnesite | 29 |
| Flake magnesium chloride | 26 |

ALBERT I. WAND.

REFERENCES CITED

The following references are of record in the file of this patent:

UNITED STATES PATENTS

| Number | Name | Date |
|---|---|---|
| 1,587,938 | Cailloux et al. | June 8, 1926 |
| 2,135,554 | Babor | Nov. 8, 1938 |
| 2,231,123 | Hubbell | Feb. 11, 1941 |
| 2,383,609 | MacDonald | Aug. 28, 1945 |

FOREIGN PATENTS

| Number | Country | Date |
|---|---|---|
| 369,807 | Germany | Mar. 31, 1932 |